United States Patent [19]

Nichols et al.

[11] Patent Number: 5,408,353
[45] Date of Patent: Apr. 18, 1995

[54] CONTROLLABLE TRANSPARENCY PANEL WITH SOLAR LOAD REDUCTION

[75] Inventors: Ralph T. Nichols, Romulus, Mich.; William J. Vincent, Nashville, Tenn.

[73] Assignee: Ford Motor Company, Dearborn, Mich.

[21] Appl. No.: 91,215

[22] Filed: Jul. 13, 1993

[51] Int. Cl.⁶ ............................................. G02F 1/01
[52] U.S. Cl. ................................... 359/275; 359/270; 359/273; 359/260; 359/297
[58] Field of Search ............... 359/275, 260, 270, 273, 359/297

[56] References Cited

U.S. PATENT DOCUMENTS

| | | |
|---|---|---|
| 2,507,036 | 5/1950 | McCrumm et al. . |
| 3,282,157 | 11/1966 | Jones et al. . |
| 3,317,266 | 5/1967 | Heller et al. . |
| 3,443,855 | 5/1969 | Land et al. . |
| 3,560,078 | 2/1971 | McIntyre et al. . |
| 4,338,000 | 7/1982 | Kamimori et al. . |
| 4,449,790 | 5/1984 | Theoni . |
| 4,659,178 | 4/1987 | Kyogoku ............................ 350/166 |
| 4,749,261 | 6/1988 | McLaughlin et al. ........... 350/339 R |
| 4,768,865 | 9/1988 | Greenberg et al. ................. 350/357 |
| 4,810,067 | 3/1989 | Demiryont . |
| 4,830,471 | 5/1989 | Demiryont . |
| 4,832,468 | 5/1989 | Ito et al. ............................ 350/357 |
| 4,837,592 | 6/1989 | Demiryont . |
| 4,842,382 | 6/1989 | Demiryont . |
| 4,844,592 | 7/1989 | Demiryont . |
| 4,844,985 | 7/1989 | Pharms et al. ...................... 428/432 |
| 4,887,890 | 12/1989 | Scherber et al. . |
| 4,892,394 | 1/1990 | Bidabad . |
| 4,917,477 | 5/1990 | Bechtel et al. . |
| 4,923,289 | 4/1990 | Demiryont . |
| 4,927,239 | 5/1990 | Melzig et al. ....................... 350/165 |
| 4,929,063 | 5/1990 | Durand et al. ...................... 350/353 |
| 5,111,329 | 5/1992 | Gajewski et al. .................... 259/275 |

OTHER PUBLICATIONS

"Encapsulated Crystals Control Viewing Pattern", a Taliq Corporation paper; Jul. 11, 1985, Issue of Machine Design.

"Electrically Controlled Light Transmission Glazing for Automotive Applications Based on NCAP Technology", published by the Society of Automotive Engineers in spring, 1989.

*Primary Examiner*—Viet Q. Nguyen
*Attorney, Agent, or Firm*—Lorraine S. Metolik; Roger L. May

[57] ABSTRACT

A laminated glazing unit has controllable transparency to visible light and a solar load reduction element which preferentially excludes infrared radiation while being substantially transparent to visible light. Electro-active material for controlling the transmission of visible light through the glazing unit is sandwiched between electrodes deposited on facing surfaces of plys or layers of an inextensible polymeric material, such as polyethylene terephthalate. One or both electrodes comprises a solar load reduction ("SLR") element, i.e., a Fabry-Perot interference filter which includes preferably at least one silver metal film sandwiched between zinc oxide films.

20 Claims, 4 Drawing Sheets

CONTROLLABLE TRANSPARENCY PANEL WITH SOLAR LOAD REDUCTION

FIELD OF THE INVENTION

This invention relates generally to laminated glazing units and, more particularly, to glazing units which provide solar load reduction together with selectively controllable transparency to visible light. Glazing units of the invention are suitable for architectural and automotive uses, as lenses and for other applications.

BACKGROUND

Glazing units are known, such as automotive and architectural glazing units and the like, which provide selectively variable transparency to visible light. Glazing units comprising electro-active elements, such as a layer of electrochromic material or liquid crystal, have been suggested for this purpose. Variable transparency elements can be used, in the non-transparent mode, to provide privacy or to reduce glare and/or heating from sunlight or other light source. The substantially transparent condition or mode may be selected for vision through the glazing unit and to allow thermal energy to pass through to heat a space enclosed or partially enclosed by the glazing unit. Liquid crystal electro-active elements including polymer layers carrying the electrodes and encapsulating the liquid crystal material are commercially available as a premanufactured unit from Taliq Corp., Sunnyvale, Calif. It incorporates a nematic liquid crystal, having a curvilinear aligned phase, with ITO electrodes, encapsulated in a PET envelope. For automotive applications, a voltage converter is used to provide 100 volt A.C. current to the unit from an automotive 12 volt D.C. source. There are also liquid crystal materials operable with a 12 volt D.C. source without voltage conversion.

Means for preferentially reflecting non-visible radiation, particularly light in the infrared range of the spectrum, may be incorporated into a glazing unit. This is particularly advantageous if the structure is utilized as a motor vehicle sunroof or as an architectural window. Reducing the solar energy passing through a glazing unit is becoming increasingly important in architectural and automotive glazing units for reasons including improved environmental control and energy conservation. Particularly in the case of automotive applications, increased glazed surface area in the upper part of the vehicle body, that is, in the window and roof area, has resulted in greatly increased solar heating of the passenger compartment of the vehicle. This is especially so in the case of a so called "all glass" roof wherein substantially the entire roof and window (including windshield) area of the motor vehicle is transparent. Such all-glass roof would likely comprise glass and/or plastic exterior plys in a laminated structure. Such heating by solar energy generally is referred to as solar load and there is a growing demand for glazing units which significantly reduce solar load. Such solar load reduction ("SLR") feature, however, cannot be permitted to unduly diminish transparency to light in the visible wavelength range. This is particularly significant in the case of motor vehicle windows, especially windshields, which may be required by government regulations to have certain minimum transmission of visible light.

It is undesirable to handle increased solar load by increasing the size of the motor vehicle air conditioning unit, in view of the overriding need to reduce the size, weight and power consumption of motor vehicle components for increased fuel efficiency. In addition, the impending mandatory use of refrigerants less efficient than those currently in use increases the need to reduce solar load. Accordingly, the need to reduce the solar energy load passing through vehicle glazing has become especially critical.

Architectural and automotive glazing applications are now calling for glazing units having selectively variable transparency to visible light together with SLR functionality. Various teachings are known to those skilled in the art regarding glazing units providing variable transparency, solar load reduction or, at some level of efficacy, both these features. Prior to the present invention, however, known glazing units having acceptable manufacturing feasibility and costs have not provided adequate SLR functionality together with effective visible light transparency control. In U.S. Pat. No. 4,338,000 issued on Jul. 6, 1982 to Kamimori et al, a panel is described which is said to be both infrared reflecting and variably transparent. The Kamimori et al device includes a glass or plastic substrate carrying on its surface a tungsten oxide film covered by a metal film which is covered, in turn, by a second tungsten oxide film. A laminating layer of polyvinylbutyral ("PVB") laminates the film covered surface of the substrate to a second substrate which has an indium-tin oxide ("ITO") film on its laminated surface. The ITO film and the metal film are connected to an electrical power source to act as electrodes for the second tungsten oxide film, which is said to provide an electrochromic effect when an electrical potential is applied across the two electrodes. The metal film electrode is said also to reflect infrared radiation. It has been found, however, that this arrangement of a single metal film sandwiched between films of tungsten oxide provides inadequate solar load reduction to meet the stringent requirements of certain automotive and architectural glazing applications. In addition, the durability of the adhesion between the PVB laminating layer and an indium tin oxide film cannot be relied upon to adequately withstand prolonged exposure to sunlight, particularly the ultra-violet component thereof.

Various glazing units are shown in U.S. Pat. No. 4,749,261 issued on Jun. 7, 1988 to McLaughlin et al. The device of McLaughlin et al employs a liquid crystal sandwiched between electrodes and further comprises outer glass plys. The disclosure of the McLaughlin et al patent is incorporated herein by reference for its teachings regarding various elements suitable for use in the laminated vision panel of the present invention. A motor vehicle sunroof is shown to have an outermost glass ply laminated to a layer of PVB to act as a UV absorber, followed by an infrared reflector, followed by a first electrode, a liquid crystal and a second electrode, followed in turn by one or more layers of polyethylene terephthalate or glass. Optionally, the sunroof also comprises a de-polarizer layer and a polarizer layer. The efficacy of the infrared reflector layer in the McLaughlin et al device cannot be determined, since no particular materials for that layer are disclosed. In fact, the McLaughlin et al patent suggests that it may be desirable that the infrared reflective material also uniformly reduce the transmission of visible light. It is suggested that, optionally, the infrared reflector layer may be the first electrode for the liquid crystal. Suitable materials for that element are said to include a stainless steel coating or a tin oxide coating on the liquid crystal material. A layer of tin oxide, however, cannot be made thick enough to provide adequate SLR functionality. Even 50,000 Angstroms on clear glass would provide only slightly better IR rejection than the glass itself. A film of stainless steel, on the other hand, if it were of adequate thickness to provide adequate SLR functionality, would exclude far too much visible light for certain automotive and architectural applications. Also, manufacturing feasibility problems would be presented in providing a stainless steel or tin oxide coating directly onto a liquid crystal material in the McLaughlin et al device. In addition, the long term durability of the adhesion of the polyvinylbutyral to such electrode material is problematical. An alternative suggested in McLaughlin et al is to use a so-called low-E coating on the outer surface of the glass ply to reflect infrared energy. Known low-E coatings, however, would present durability issues if used on automotive glazing units in view of the abrasion and other difficult aspects of the use environment experienced by automotive glazing. In another embodiment said to be suitable for architectural purposes, an infrared reflective layer is shown on an outside surface of a layer of glass. The materials suggested for such layer, however, including ITO and tin oxide, do not provide sufficient preferential exclusion of infrared radiation verses visible light to meet the needs of various automotive and architectural applications. In addition, while McLaughlin et al suggest that the electrode for the liquid crystal material may serve also as the IR reflective material, the materials suggested for such combined part are, as discussed above, unable to meet the needs of various automotive and architectural applications.

It is an object of the present invention to provide a glazing unit having both means for selectively controlling transparency and, in addition, means for solar load reduction even when the vision panel is in a transparent mode. It is an object of certain preferred embodiments of the invention to provide a glazing unit which can be manufactured in accordance with commercially practical methods and technologies and which provides effective, full-time solar load reduction together with electro-active means for selectively controlling transparency to visible light. It is a particular object of certain most preferred embodiments of the invention to provide such a glazing unit which is suitable for use as a window in a motor vehicle.

SUMMARY OF THE INVENTION

According to the present invention, a laminated glazing unit is provided which is substantially transparent to visible light in at least one selectable condition. The glazing unit of the invention comprises a ply which is substantially transparent, substantially inextensible and substantially self-supporting, generally forming an exterior ply of the glazing unit and being referred to as such herein. It may have one or more coatings, films or the like on its exterior surface. The interior surface of the exterior ply ("interior" in this usage meaning its laminated surface, that is, the surface which is laminated to, and forms an interface with, another ply or element of the glazing unit) is laminated to an electro-active means for controlling transparency to visible light. The electro-active means comprises first and second flexible, substantially inextensible polymer layers. First and second electrodes are provided on the inward surfaces of the polymer layers, and a layer of electro-active material is sandwiched between the electrodes. The electro-active material is controllably switchable from a first condition in which it is substantially transparent to visible light to a second, less transparent condition by selected application of electrical potential across the electrodes. Thus, in use, the electrodes of the glazing unit will be operatively connected to a source of electrical energy, such as the battery or, preferably, the generator or alternator system of a motor vehicle. The electro-active means is laminated to the self-supporting exterior ply by means of a layer of flexible polymeric material, for example polyvinylbutyral.

To meet the growing need for glazing units having highly efficient solar load reduction capability, particularly for architectural and automotive glazing applications, the glazing unit of the present invention further includes highly effective SLR functionality. Specifically, in the present invention at least one of the aforesaid electrodes is a Fabry-Perot interference filter and serves the functions of electrode and highly effective SLR element. Such SLR element reduces solar energy passed through the glazing unit even when the electro-active means is in its transparent condition. The SLR element preferentially excludes non-visible wavelengths (most notably infrared wavelength) radiation while permitting a large percentage of visible wavelength light to pass through the glazing unit. To meet not only the high SLR functionality requirements of certain architectural and automotive applications, but also applicable manufacturing cost and feasibility requirements, the SLR element of the present invention preferably is a sputter coated Fabry-Perot interference filter. Most preferably, the Fabry-Perot interference filter employed in the present invention as an electrode and, in addition, as an SLR element is a film stack comprising, in order, a first continuous zinc oxide film, then a first continuous silver metal film directly over the first zinc oxide film, then a second continuous zinc oxide film, then a second continuous silver metal film and a third continuous zinc oxide film. As discussed further below, the third dielectric film and the second silver film can be deleted, leaving a three layer Fabry-Perot interference filter/electrode. For example, in certain embodiments of the invention both electrodes are three layer Fabry-Perot interference filters.

These and additional features and functions of the glazing unit of the invention and its various advantages will be better understood from the following detailed description of various preferred embodiments. Certain features or elements which can optionally be included in certain embodiments of the invention also are disclosed and discussed below.

BRIEF DESCRIPTION OF THE DRAWINGS

It should be understood that features and elements of the embodiments of the invention illustrated in FIGS. 1 through 5 are not necessarily precisely to scale. The thicknesses of the electrodes are shown larger than true scale, for example, for ease of illustration and better understanding.

DESCRIPTION OF PREFERRED EMBODIMENTS

Glazing units in accordance with the present invention may be adapted for use as architectural windows, including skylights; motor vehicle windows, including windshields and sunroofs; privacy glass for various applications such as motor vehicle or interior building partition panels; and other applications. In all such applications the features and functions of the invention follow the general principles discussed below. The invention provides particular advantage and is particularly suitable for use in motor vehicle glazing applications in which the rapidly increasing demand for ever greater glazed area (in lieu of metal or other opaque body panel materials) in the window and roof area has created a sharply felt need for glazing panels having significantly improved SLR functionality. At the same time, such increased use of glazing has increased the need for some means of providing privacy, reduced glare or even total sun block for the vehicle occupants in some or all of the glazed area.

Certain preferred embodiments of the invention employ a liquid crystal element as the electro-active means. Other embodiments employ an electrochromic element. In those which employ a liquid crystal element, transparency of the glazing unit to visible light is controlled by selectively switching between transparent and translucent conditions. The translucent condition causes light scattering and generally little light exclusion. Thus, glazing units of the invention employing a liquid crystal element in the electro-active means can provide privacy and reduced glare. In those embodiments which employ an electrochromic element in the electro-active means, transparency of the glazing unit to visible light is controlled by selectively switching between transparent and less transparent, or even opaque, conditions. Thus, glazing units of the invention employing an electrochromic element can provide privacy, reduced glare and, in addition, total or partial blocking for enhanced SLR functionality.

The preferred embodiments of the invention now described, employing a liquid crystal electro-active element, can satisfy stringent functional requirements, for example, excluding as much as 65% of the total incident solar radiation while transmitting a large percentage, even 70%, of the incident visible light when the electro-active means of the glazing unit is in its transparent condition. In preferred embodiments employing an electrochromic element, the same transmittance can be achieved in the transparent state, while more than 95% of total incident solar radiation is excluded when the electro-active element is in its non-transparent state. Those skilled in the art will recognize in the light of this disclosure, that the actual percentages for any given embodiment will depend on numerous, well understood factors, such as the thickness and any tinting of the various glass (or plastic, etc) plys of the glazing unit, coatings (e.g., anti-reflection coatings, etc.) on exterior or interior (i.e., laminated) surfaces of the plys, etc.

Beyond merely providing the aforesaid SLR functionality and controllable transparency features, these glazing units have advantageous weight, bulk and cost characteristics. They are relatively thin in cross section and, for the degree of functionality provided, have relatively good manufacturing feasibility coupled with relatively low manufacturing costs. In addition, they are sufficiently durable to withstand prolonged use in an automotive environment. In particular, they can maintain good interfacial adhesion between laminated layers even after prolonged exposure to sunlight or other source of UV radiation.

Figure 1:
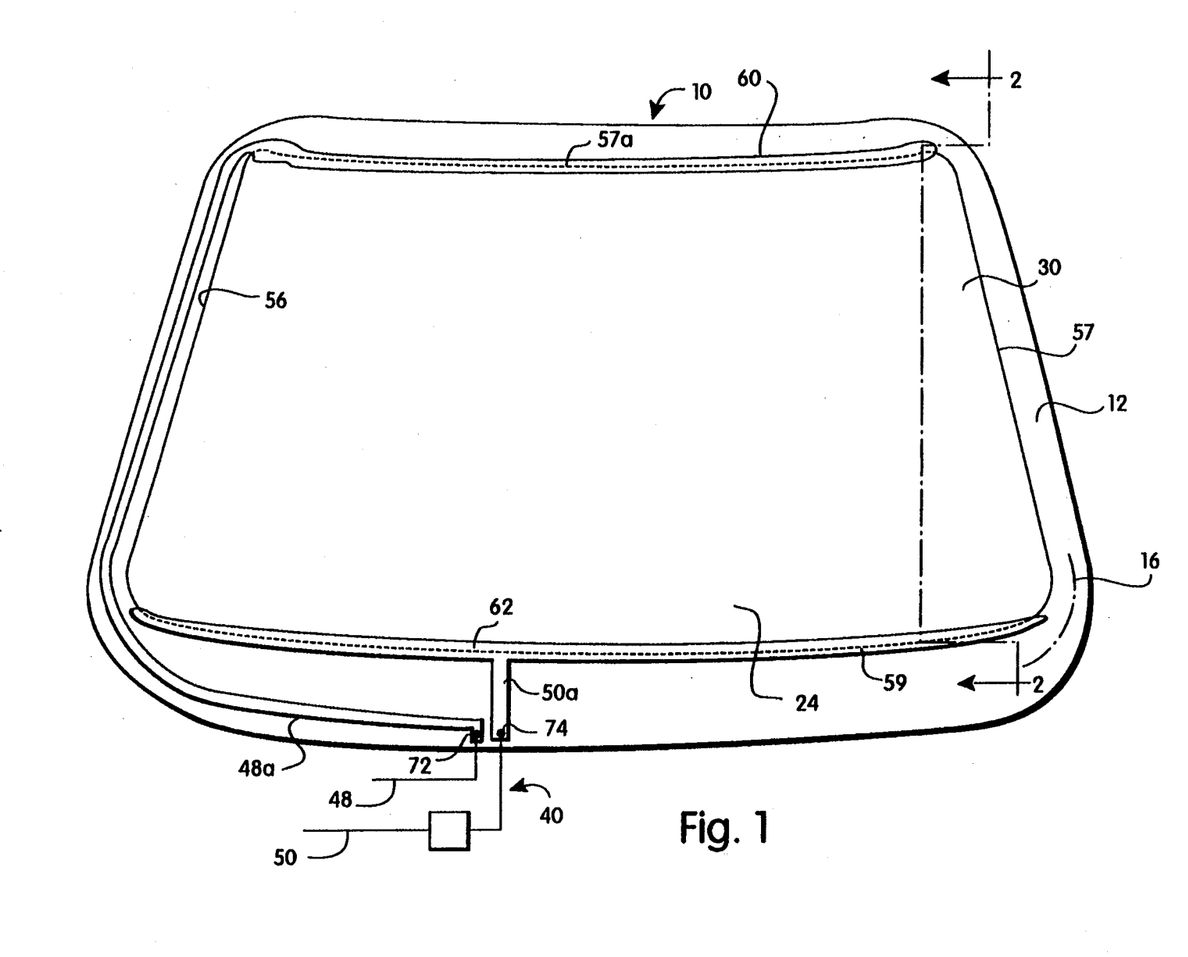
FIG. 1 is a schematic view of a preferred embodiment of the glazing unit of the invention, specifically, a motor vehicle window.
Figure 2:
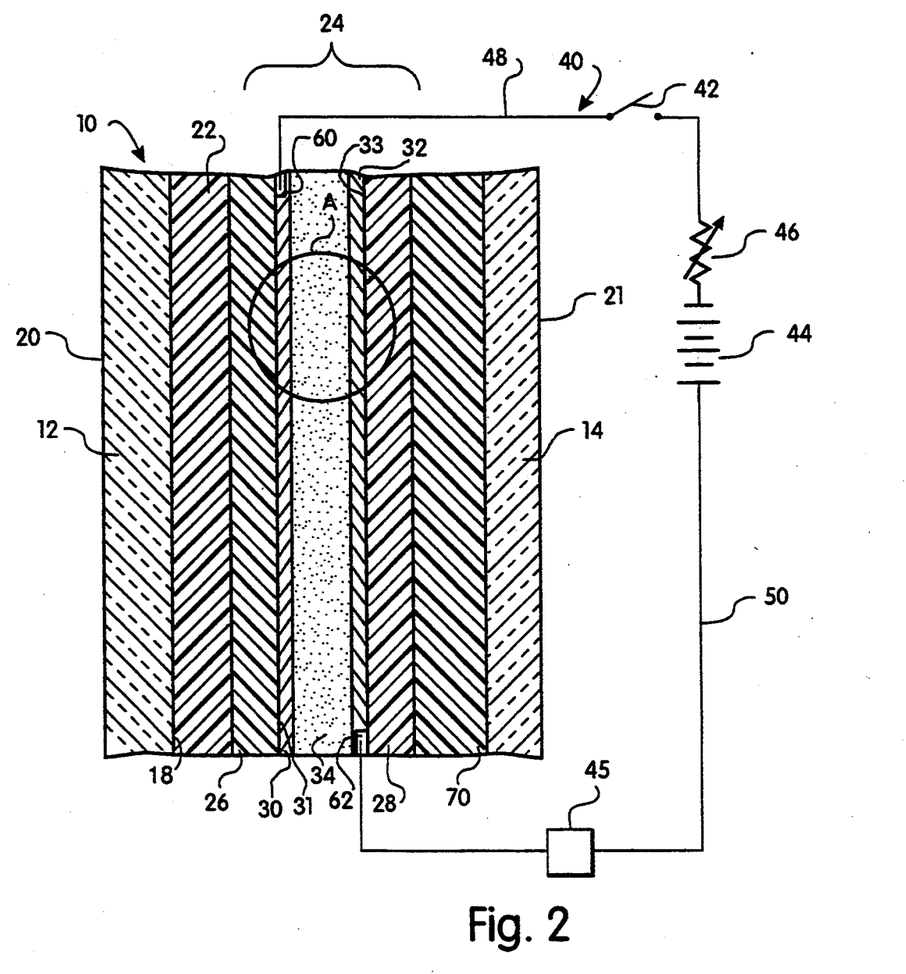
FIG. 2 is a schematic sectional view, partially broken away, of the motor vehicle window of FIG. 1 taken through line 2—2, wherein connection of the electro-active means of the window to an external electrical circuit is illustrated diagrammatically.
Figure 3:
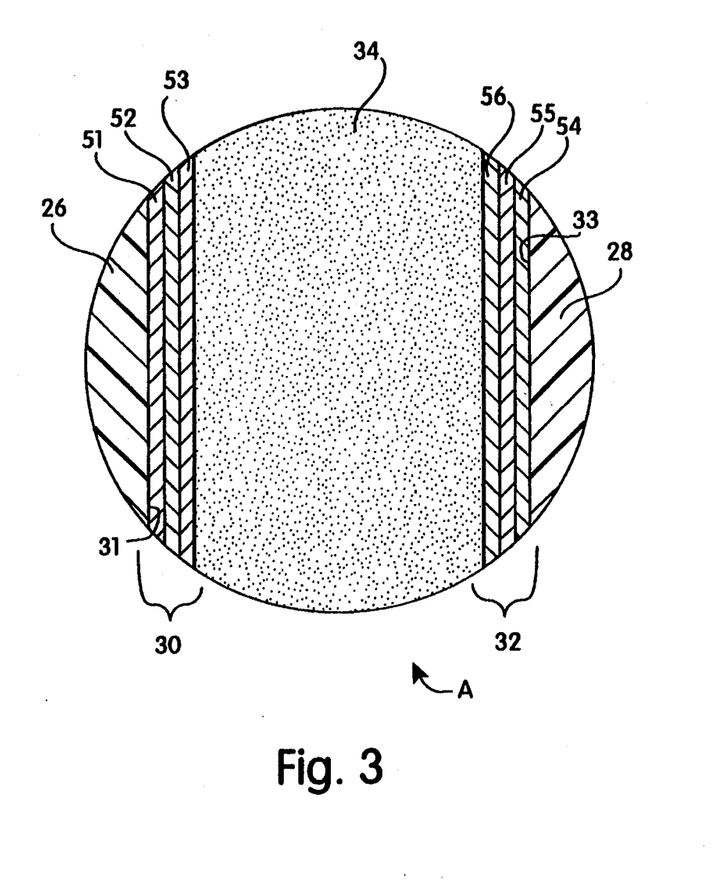
FIG. 3 is an enlarged view of area A of FIG. 2.

Referring now specifically to FIGS. 1 through 3, a glazing unit 10, in accordance with a preferred embodiment of the invention, is adapted for use as a motor vehicle window, for example a moon roof. Window 10 comprises transparent outer glass ply 12 and inner glass ply 14. As used herein the term "transparent" means substantially transparent at least to visible light, that is, to radiation in the visible wavelength range. Suitable transparent substrate materials and constructions alternative to glass plys will be apparent to the skilled in the art in view of the present disclosure. Selection of a particular outer and inner ply material will depend, in part, on the particular application to be made of the glazing unit. Commercially available materials alternative to glass include, for example, plastics such as polyethylene terephthalate ("PET"), polycarbonate, polymethylmethacrylate, polyurethane and the like. Optionally, additional functional or decorative elements may be added, such as an anti-reflective coating or other coating on any appropriate surface of the outer and inner plys.

Glazing unit 10 further comprises electro-active element 24 and a ply 22 of laminating material laminating electro-active element 24 to outer glass ply 12. A second laminating layer 70 serves to laminate the electro-active element 24 to the second glass ply 14. Suitable laminating materials are commercially available and well known to those skilled in the art. Most preferred is polyvinylbutyral (PVB). Electro-active element 24 controls the transparency of the glazing unit to visible light by selected application of electrical potential as further described below. Electro-active element 24 comprises first and second flexible, substantially inextensible polymer layers 26 and 28. Suitable materials for inextensible layers 26 and 28 are commercially available and well known to those skilled in the art. Most preferred is polyethylene terephthalate ("PET"). First and second electrodes 30 and 32 are provided on the inward facing surfaces 31 and 33, respectively, of layers 26 and 28. The electrodes must be substantially transparent to visible light. Numerous suitable materials for electrodes 30 and 32 are commercially available and are well known to those skilled in the art. Suitable materials include, for example, a substantially transparent sputter coated film of indium-tin oxide (ITO), chrome, silver, stainless steel, tin oxide or indium oxide. Fabrication techniques for the electrodes also are well known to those skilled in the art including, most preferably, sputter coating techniques well known to the skilled of the art. Alternative materials and fabrication techniques will be apparent to those skilled in the art in view of the present disclosure.

In addition to the electrode materials mentioned above, it is a significant feature of the present invention that at least one of the electrodes is a Fabry-Perot interference filter (hereinafter sometimes referred to as an "SLR electrode") which is more transparent to visible light than to other wavelengths. That is, one or both electrodes 30, 32 of the electro-active element 24 provides highly effective SLR functionality. That is, it excludes a substantial portion of the incident radiation, especially the infrared wavelength radiation, while transmitting a substantial portion of the visible light. Thus, even with such SLR functionality, the glazing unit of the invention, at least in accordance with preferred embodiments, is highly transparent to visible light.

In the preferred embodiment of FIGS. 1-3, both electrodes 30 and 32 are Fabry-Perot interference filters consisting essentially of a sputtered film stack wherein a single metal film is sandwiched directly between two metal oxide films. Specifically, the Fabry-Perot interference filter forming SLR electrode 30 has a first continuous zinc oxide film 51 of about 300 to 450 Angstroms directly on surface 31 of PET layer 26. A continuous silver metal film 52 of about 70 to 120 Angstroms directly covers zinc oxide film 51. A second continuous zinc oxide film 53 of about 300 to 450 Angstroms is directly over silver film 52. SLR electrode 32 is substantially identical to electrode 30. Thus, it has a zinc oxide film 54 directly on surface 33 of PET layer 28. Silver film 55 directly overlies film 54 and second zinc oxide film 56 directly overlies silver film 55.

Figure 4:
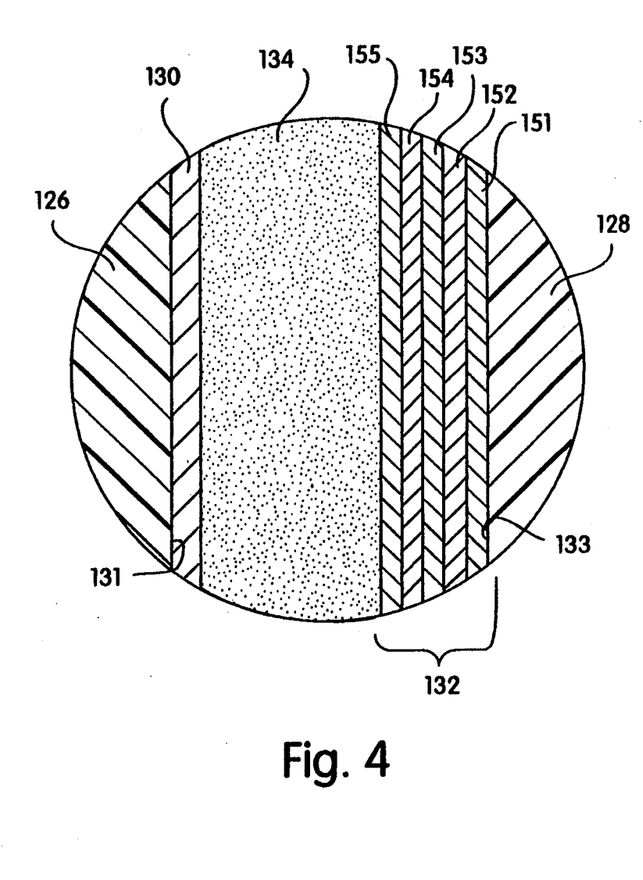
FIG. 4 is a schematic sectional view (corresponding to the view of FIG. 2) of a second preferred embodiment of the invention.

In the alternative preferred embodiment illustrated in FIG. 4, electrode 130 on surface 131 of PET film 126, corresponding to electrode 30 in FIGS. 1-3, is not an SLR electrode. That is, it is not a Fabry-Perot interference filter film stack. It may, for example, be a single sputtered film of indium-tin-oxide or any of the other electrode materials mentioned above. Electrode 132 is an SLR electrode in accordance with the invention, specifically, a Fabry-Perot interference filter consisting essentially of a sputtered film stack having, in order: a first continuous zinc oxide dielectric film 151 having a preferred thickness of about 300 to 450 Angstroms sputtered directly onto surface 133 of PET layer 128; a first continuous electrically conductive silver metal film 152 having a thickness of about 70 to 120 Angstroms directly over film 151; a second continuous zinc oxide dielectric film 153 having a thickness of about 650 to 1000 Angstroms directly over film 152; a second continuous silver metal film 154 having a thickness of about 70 to 120 Angstroms directly over film 153; and a third continuous zinc oxide dielectric film 155 having a thickness of about 300 to 450 Angstroms directly over film 154. Those skilled in the art will appreciate that thicker films of silver, etc. can be used in applications having lower requirements for transmittance of visible light. Likewise, the use of clear glass or tinted glass for one or both of the glass plys will affect the permissible film thickness for a given transmittance requirement.

The Fabry-Perot interference filter employed for the SLR electrodes of the present invention can be deposited by various means, e.g., sputter coating techniques and chemical vapor deposition techniques well known to those skilled in the art. It should be noted that the thin films employed in the Fabry-Perot film stack have essentially no structural integrity of their own. Thus, it is an important feature of the present invention that the film stack is deposited onto the surface of a substantially inextensible substrate such as a film of polyethylene terephthalate ("PET"). Coating such films onto the surface of the PVB laminating layer would be substantially impossible. The PVB would break down in the vacuum atmosphere used for sputtering and could not withstand the temperature of a chemical vapor deposition ("CVD") process. It is a significant advantage of the present invention that sputter coating processes and equipment for forming an SLR electrode are readily commercially available and well known to those skilled in the art. Sputter coating technology is presently commercially employed, for example, to deposit similar film stacks onto glass plys of a laminated automotive windshield for the purpose of electrically heating the windshield.

While alternative materials are known for both the metal and the dielectric materials of the film stack, the particular materials and thickness specified above are found to provide an important coincidence of advantages, for example, in preferred embodiments, up to 65% exclusion of total incident solar energy with at least 70% transmittance of visible light, commercially available and feasible manufacturing techniques, and excellent long term durability in architectural and automotive use environments. Those skilled in the art will appreciate that thicker films of silver, etc. can be used in applications not requiring 70 % transmittance of visible light. Likewise, the use of clear glass or tinted glass for one or both of the glass plys will affect the permissible film thickness for a given transmittance requirement. Likewise, the use of dyes and pigments in the polymer layers of the device will affect transmittance.

Referring again to FIGS. 1 to 3, electro-active material 34 is disposed between the SLR electrodes 30 and 32. In FIG. 4, electro-active material 134 is between electrode 130 and SLR electrode 132. As used herein, an electro-active material is any suitable material whose transparency to visible light is controllably switchable from a first condition substantially transparent to visible light to a second, less transparent condition by selected application of electrical potential across the aforesaid electrodes. Preferably, the transparency of the electro-active material is continuously variable. As noted above, suitable electro-active materials include liquid crystals and electrochromic materials. Numerous materials of both types are commercially available and are well known to those skilled in the art. Suitable liquid crystal materials, for example, are disclosed in U.S. Pat. No. 4,749,261 discussed above, the disclosure of which is incorporated herein by reference. It will be appreciated that the inextensible layers 26 and 28 in addition to providing a suitable substrate surface for the electrodes 30, 32 preferably cooperate with each other to form an enclosure to contain the liquid crystal or other electro-active material. The liquid crystal preferably is a nematic or operationally nematic liquid crystal having positive dielectric anisotropy with suitable index of refraction characteristics. One preferred type of liquid crystal is a nematic droplet/polymer film liquid crystal. The material of the liquid crystal film can be made by any of several known processes, including micro-encapsulation, temperature induced phase separation, solvent induced phase separation, and polymer induced phased separations.

Suitable electrochromic materials also are commercially available and well known to those skilled in the art. Exemplary materials include tungsten oxide in accordance with the teachings of U.S. Pat. No. 4,768,865 to Greenberg et al, copper oxide in accordance with the teaching of U.S. Pat. No. 4,830,471 to Demiryont, and bismuth oxide in accordance with the teaching of U.S. Pat. No. 4,842,382 to Demiryont, all of these patents being incorporated herein by reference for their teaching of electrochromic materials and the use thereof in glazing units or the like. Alternative materials are commercially available and their use in the present invention will be apparent to those skilled in the art in view of the present disclosure.

In the preferred embodiment illustrated in FIGS. 1 to 3, electrodes 30 and 32 are in electrical connection with a source of electrical power by means of circuit 40 illustrated diagrammatically. Circuit 40 is seen to comprise on/off switch 42, electrical power source 44, variable resister 46 and electrical leads 48 and 50. Circuit 40 allows an operator to selectively apply an electrical potential to the electro-active material 34 from electric power supply 44. In the case of an automotive application, such power supply typically would be the vehicle battery or the vehicle generator or alternator with appropriate electronic controls to produce electrical current of the desired frequency and amplitude. Certain electro-active units suitable for use in the present invention, available from Taliq Corp., Sunnyvale, Calif., for example, call for 100 volt A.C. current. Referring particularly to FIG. 1, circuit 40 preferably further comprises circuitry means 45 for interrupting power supply to circuit 40 in the event of a discontinuity or other fault in the electro-active element. Electrode 30 is shown to have a visible outer perimeter 57, although in actual application the perimeter may not be noticeable. Electrode 32 is substantially coextensive with electrode 30, both being substantially coextensive with the electro-active material. Horizontally extending upper bus bar 60 is seen to be in substantially continuous line contact with upper edge portion 57a of perimeter 57 of electrode 30. Similarly, lower bus bar 62 is in substantially continuous line contact with lower edge portion 59 of the outer perimeter of the second electrode 32. Thus, application of electrical power to circuit 40 applies electrical potential across the electrodes, thereby controlling the transparency of the electro-active material to visible light. Methods of forming bus bars 60 and 62 are well known to those skilled in the art and will be apparent in view of the present invention.

Lead 48 connects to lead 48a at terminus 72. Lead 48a extends within the glazing unit from terminus 72 to upper bus bar 60. Similarly, lead 50 is connected to lead 50a at terminus 74 and lead 50a runs to lower bus bar 62. In the case of a motor vehicle, 50 and 50a preferably would be connected to the "hot" wire of the vehicle electrical system and leads 48 and 48a would be connected to ground. Termini 72 and 74 typically comprise a solder pad when the electrode is applied to a glass substrate, but can consist of copper foil or other electrically conductive material which may be adhered to electrodes 30, 32 by means of electrically conductive adhesive such as silver filled epoxy. The switch 42 may be a manually operated switch, although circuit 40 may include components automatically responsive to ambient light and/or temperature conditions. Circuit 40 may further include a variable resistance element, such as a variable resistor or potentiometer, or circuitry for varying the magnitude of electric field applied by electrodes 30, 32 to the electro-active material 34. Such variable element could be manually or automatically adjustable, preferably to render the transparency of the electro-active material continuously variable.

According to one preferred embodiment of the invention, circuitry is provided to pass current through one or both electrodes of a glazing unit of the invention to electrically generate heat, that is, to electrically heat the glazing unit. Electrical current for heating is passed preferably through the SLR electrode in an embodiment such as that of FIG. 4 wherein only one of the electrodes is an SLR electrode. Thus, the SLR electrode can act as an electrode for the electro-active element and provide solar load reduction and electrical heating functions. Suitable circuitry for this purpose for a glazing unit of the present invention will be apparent to the skilled of the art in view of the present disclosure. It will likewise be within the ability of those skilled of the art to determine whether actuation of such circuitry causes a change in the transparency of the electro-active material and to adapt the use of the glazing unit accordingly.

Figure 5:
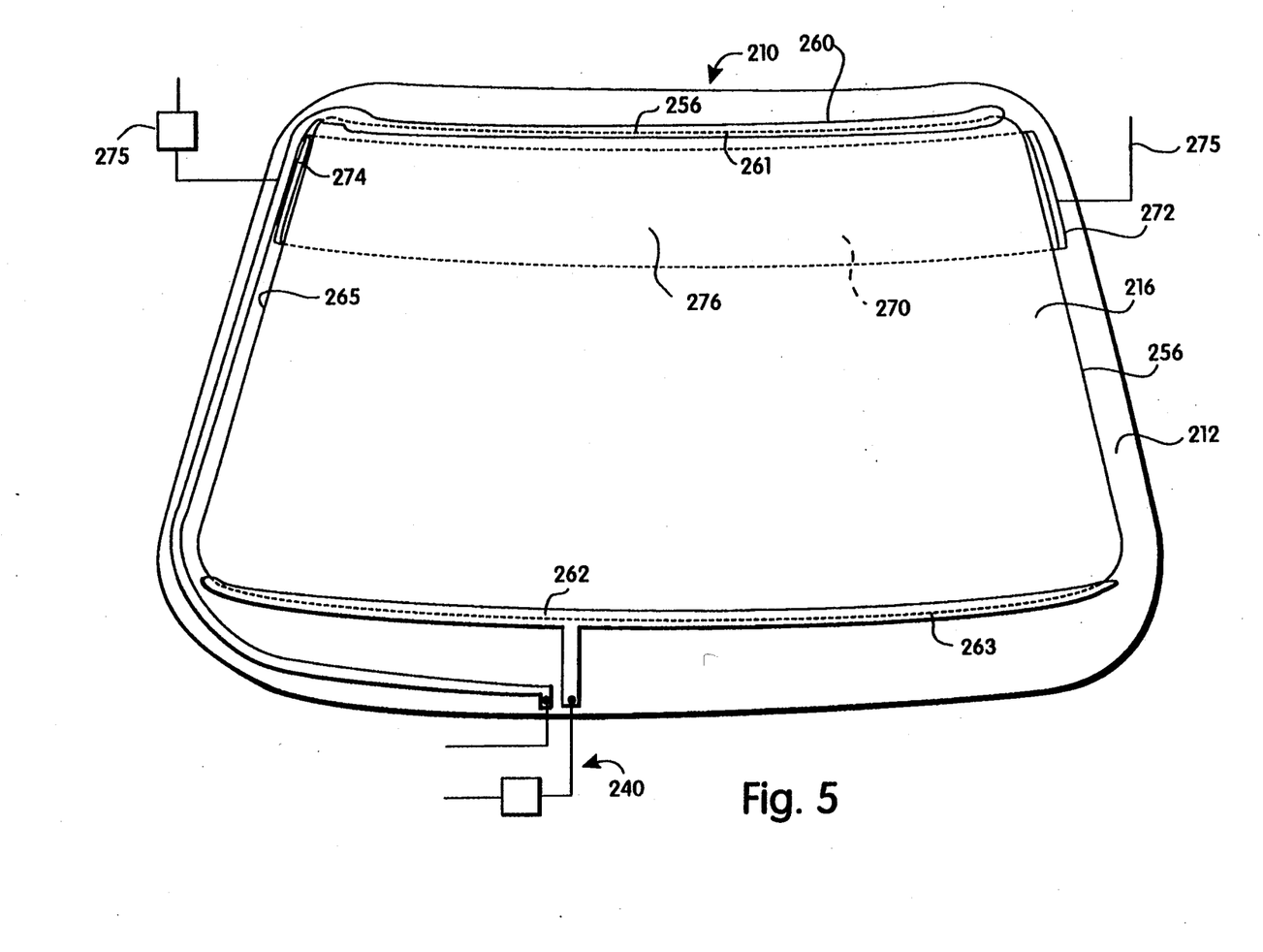
FIG. 5 is a schematic view of another preferred embodiment of the glazing unit of the invention, specifically, an electrically heated motor vehicle windshield.

A particularly advantageous embodiment of the invention is illustrated in FIG. 5. The embodiment of FIG. 5 is adapted for use as a motor vehicle windshield. For motor vehicle windshield applications, it presently is preferred to employ a multi-ply, laminated construction having a glass inner ply and a glass outer ply. Motor vehicle windshield 210 comprises an SLR element 216 having an outer perimeter 256. The SLR film stack is seen to be substantially coextensive with the vision area of the windshield. The SLR element is a Fabry-Perot interference filter sputter coated onto the laminated inside surface of outer glass ply 212. Electrical circuit 240 provides electrical energy from the motor vehicle's electrical power system to the SLR element for electrical heating of the SLR element for purposes of deicing or defogging the windshield. Such circuitry includes manual and/or automatic switching means for actuating and de-actuating the heating function, circuit fault detection circuitry and such other features as are described above. Included in such circuitry are upper bus bar 260 and lower bus bar 262 which are in electrical contact with the upper edge 261 and the lower edge 263, respectively, of the SLR film stack. To provide good distribution of electrical power, and hence heating, in the SLR element, the bus bars, as shown, preferably comprise a pair of spaced, substantially parallel, elongate bus bar in electrical contact with opposite edges of the SLR film stack. Since the lower bus bar is longer than the upper bus bar, a recess preferably is provided at the left side (as viewed in FIG. 5) of the lower edge of the upper bus bar 260. A similar recess should be provided on the right side if a second electrical lead is used to connect the right side of the upper bus bar to circuit 240. A recess also is desirable at the intersection of the upper bus bar with the edge of the SLR film stack. The recesses serve to more evenly distribute electrical power.

A second set of bus bars provides electrical power to an electro-active element 270. Specifically, right side electrode 272 and left side electrode 274 provide power via circuit 275 to apply an electric field across an electro-active material 276 within the electro-active element 270 to control its transparency to visible light. The electro-active element 270 extends laterally across the upper portion of the windshield. The first set of bus bars and the SLR/electrical heating element are electrically isolated from the second set of bus bars and the electro-active element. Such electrical isolation can be provided, at least in part, by a laminating layer positioned between them, preferably PVB.

Since the glazing unit of FIG. 5 is intended for use as a motor vehicle windshield, the electro-active material 276 covers only its upper portion. Thus, even in its nontransparent condition, the electro-active element does not prevent the driver's vision through the main area of the windshield, for example, the area designated as "AS1" by U.S. Federal Motor Vehicle Safety Standard No. 205. The electro-active element can be used to partially or totally block sunlight glare which at times would itself otherwise seriously reduce a driver's vision. Preferably the electro-active material extends across substantially the entire width of the windshield in the uppermost 10% to 25% portion of the windshield. One or both electrodes of the electro-active element 270 is (are) SLR electrode(s) in accordance with the invention as disclosed and discussed above. The SLR functionality would be additive to that provided by the SLR/electrical heating element in the upper portion of the glazing unit.

It will be appreciated from the foregoing that the present invention provides high SLR functionality together with transparency control. The glazing unit can be produced using currently available fabrication equipment and techniques. In addition, the particular materials and configuration of the glazing unit provide good long term durability and functionality, particularly with respect to interfacial adhesion of the laminated surfaces. It should be recognized that either or both exterior surfaces 20 and 21 and any interior surface may carry a film or coating. Reference herein to a surface as a "laminated" surface means that it forms a laminated interface with another ply within the laminated structure.

While particular embodiments of the invention have been illustrated and described, it will be apparent to those skilled in the art in view of the above disclosure that various modifications can be made without departing from the true spirit and scope of the invention. The appended claims are intended to cover all such modifications.

We claim:

1. A laminated glazing unit which is substantially transparent to visible light in at least a first condition and less transparent in a second condition, the glazing unit comprising:
    a first ply which is substantially transparent and substantially inextensible;
    electro-active means for controlling transparency to visible light, the electro-active means comprising (i) first and second flexible, substantially inextensible polymer layers, each having an inward surface facing the other, (ii) first and second electrodes on the inward surface of the first and second polymer layers, respectively, and (iii) a layer of electro-active material sandwiched between the electrodes, the electro-active material being controllably switchable from the first condition to the second, less transparent condition by selected application of electrical potential across the electrodes; and
    a first laminating layer of flexible polymeric material laminated between a surface of the first ply and an outward surface of the first polymer layer of the electro-active means;
    wherein at least one of the first and second electrodes is a Fabry-Perot interference filter for reducing non-visible radiation transmitted through the glazing unit, comprising a metal film sandwiched between films of dielectric material.

2. The laminated glazing unit of claim 1 wherein the electro-active material is a liquid crystal.

3. The laminated glazing unit of claim 2 wherein the liquid crystal is a nematic liquid crystal.

4. The laminated glazing unit of claim 1 wherein the electro-active material is an electrochromic material.

5. The laminated glazing unit of claim 4 wherein said electrochromic material is tungsten oxide.

6. The laminated glazing unit of claim 1 wherein the first and second electrodes each is a Fabry-Perot interference filter consisting essentially of a metal film sandwiched between films of dielectric material.

7. The laminated glazing unit of claim 6 wherein the metal film is a sputtered film of silver metal about 70 to 120 to Angstroms thick, and each of the films of dielectric material is a sputtered film of zinc oxide about 300 to 450 Angstroms thick.

8. The laminated glazing unit of claim 1 wherein only one of the first and second electrodes is a Fabry-Perot interference filter, that one consisting essentially of at least two metal films separated from each other by a spacer film of dielectric material and sandwiched between two additional films of dielectric material.

9. The laminated glazing unit of claim 8, wherein each of the two metal films is a sputtered film of silver metal about 70 to 120 Angstroms thick, the spacer film of dielectric material is a sputtered film of zinc oxide about 650 to 1000 Angstroms thick, and each of the additional films of dielectric material is a sputtered film of zinc oxide about 300 to 450 Angstroms thick.

10. The laminated glazing unit of claim 1 further comprising a second ply which is substantially transparent and substantially inextensible, and a second laminating layer of flexible polymeric material laminating the second ply to an outward surface of the second polymeric layer of the electro-active means, the electro-active means being sandwiched between the first laminating layer and the second laminating layer.

11. A laminated glazing unit which is substantially transparent to visible light in at least a first condition and substantially non-transparent in a second condition, the glazing unit comprising:
    electro-active means for controlling transparency to visible light, the electro-active means comprising (i) first and second electrodes between which are sandwiched (ii) a layer of electro-active material which is controllably switchable from the first condition to the second condition by selected application of electrical potential across the electrodes, and (iii) first and second flexible, substantially inextensible polymeric layers between which are sandwiched the electrodes and electro-active material, wherein the electrodes are sputter coated onto an inward surface of a corresponding one of the inextensible polymeric layers;
    first and second substantially transparent, substantially self-supporting plys sandwiching between them said electro-active means; and
    first and second laminating layers of flexible polymeric material laminated between the electro-active means and the first and second substantially self-supporting plys, respectively;
    wherein at least one of the electrodes is a Fabry-Perot interference filter comprising a film stack wherein a sputtered film of silver metal is sandwiched between sputtered films of zinc oxide.

12. The laminated glazing unit of claim 11 wherein the first and second self-supporting plys are glass.

13. The laminated glazing unit of claim 11 wherein the polymeric layers are polyethylene terephthalate.

14. The laminated glazing unit of claim 11 wherein the electro-active material is a nematic droplet/polymer film liquid crystal.

15. A laminated glazing unit which is substantially transparent to visible light in at least a first condition, the glazing unit comprising:
- a first ply which is substantially transparent, substantially inextensible and substantially self-supporting;
- electro-active means for controlling the amount of visible light transmitted through the glazing unit, the electro-active means comprising (i) first and second flexible, substantially inextensible polymer layers, each having an inward surface facing the other, (ii) first and second electrodes on the inward surface of the first and second polymer layers, respectively, and (iii) a layer of electro-active material sandwiched between the electrodes, the electro-active material being controllably switchable from the first condition substantially transparent to visible light to a second, less transparent condition by selected application of electrical potential across the electrodes, wherein at least one of the electrodes is a Fabry-Perot interference filter comprising a metal film sandwiched between films of dielectric material;
- a first laminating layer of flexible polymeric material laminating a surface of the first ply to an outward surface of the first polymer layer of the electro-active means; and
- electrical heating means for passing an electrical current through the Fabry-Perot interference filter for electrically heating the glazing unit.

16. A laminated motor vehicle windshield comprising a glass ply coextensive with the windshield and laminated to electro-active means extending laterally across only an upper portion of the windshield for controlling the transparency of the upper portion, wherein the electro-active means comprises a layer of electro-active material substantially coextensive with said upper portion of the windshield and sandwiched between first and second electrodes substantially coextensive with the layer of electro-active material, at least one of the electrodes comprising a Fabry-Perot interference filter wherein a film of metal is sandwiched between films of dielectric material.

17. The laminated motor vehicle windshield of claim 16 further comprising an electrically conductive film on, and substantially coextensive with, a laminated surface of a substantially inextensible ply of the windshield, an electrical heating means for passing an electrical current through the interference filter, the electrical heating means being effectively electrically isolated from the electro-active means.

18. The laminated motor vehicle windshield of claim 16 wherein the electro-active means extends across approximately an upper 10% to 25% portion of the windshield.

19. A method of making a laminated glazing unit, comprising:
- sputter coating onto a substantially inextensible first polymeric sheet a first electrode consisting essentially of an electrically conductive film stack wherein at least one film metal is sandwiched between films of dielectric material;
- forming an electro-active element by sandwiching an electro-active material between the first polymeric sheet and a second polymeric sheet having a second electrode on a surface thereof, the first and second electrodes facing inwardly toward the electro-active material and each other wherein at least one of the first and second electrodes is a Fabry-Perot interference filter for reducing non-visible radiation transmitted though the glazing unit, comprising a metal film sandwiched between films of dielectric material; and
- laminating the electro-active element to a substantially self-supporting ply of the glazing unit.

20. A motor vehicle passenger compartment roof comprising a glazing unit which is substantially transparent to visible light in at least a first condition and substantially non-transparent in a second condition, the glazing unit comprising:
- electro-active means for controlling transparency to visible light, the electro-active means comprising (i) first and second electrodes between which are sandwiched (ii) a layer of electro-active material which is controllably switchable from the substantially transparent condition to the substantially non-transparent condition by selected application of electrical potential across the electrodes, and (iii) first and second flexible, substantially inextensible polymeric layers between which are sandwiched the electrodes and electro-active material, wherein the electrodes are sputter coated onto an inward surface of a corresponding one of the inextensible polymeric layers;
- first and second substantially transparent, substantially self-supporting plys between which are sandwiched said electro-active means; and
- first and second laminating layers of flexible polymeric material laminated between the electro-active means and the first and second substantially self-supporting plys, respectively;
- wherein at least one of the electrodes is a Fabry-Perot interference filter comprising a film stack wherein a sputtered film of silver metal is sandwiched between sputtered films of zinc oxide.

* * * * *